A. P. & J. C. WELLS.
BIT STOCK.
APPLICATION FILED MAR. 27, 1912.

1,059,242.

Patented Apr. 15, 1913.

Witnesses
G. R. Pierce
James Roel

Inventors
A. P. Wells
J. C. Wells
By Victor J. Evans
Attorney

UNITED STATES PATENT OFFICE.

ALPHERD P. WELLS AND JOSEPH C. WELLS, OF EAST STONE GAP, VIRGINIA, ASSIGNORS OF ONE-EIGHTEENTH TO JOHN GOODLOE, ONE-EIGHTEENTH TO WILLIAM GOODLOE, ONE-EIGHTEENTH TO EDWARD GOODLOE, AND ONE-SIXTH TO A. H. REEDER, ALL OF BIG STONE GAP, VIRGINIA.

BIT-STOCK.

1,059,242. Specification of Letters Patent. Patented Apr. 15, 1913.

Application filed March 27, 1912. Serial No. 686,464.

*To all whom it may concern:*

Be it known that we, ALPHERD P. WELLS and JOSEPH C. WELLS, citizens of the United States, residing at East Stone Gap, in the county of Wise and State of Virginia, have invented new and useful Improvements in Bit-Stocks, of which the following is a specification.

This invention relates to coal augers and has for an object to provide apparatus of this character which will possess a maximum efficiency and which will be capable of being driven with a minimum amount of power.

Figure 1:
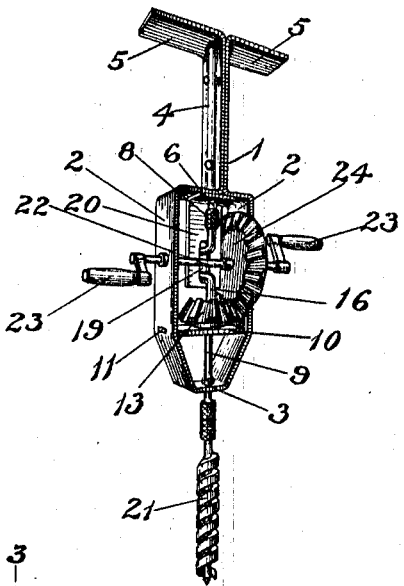
Figure 2:
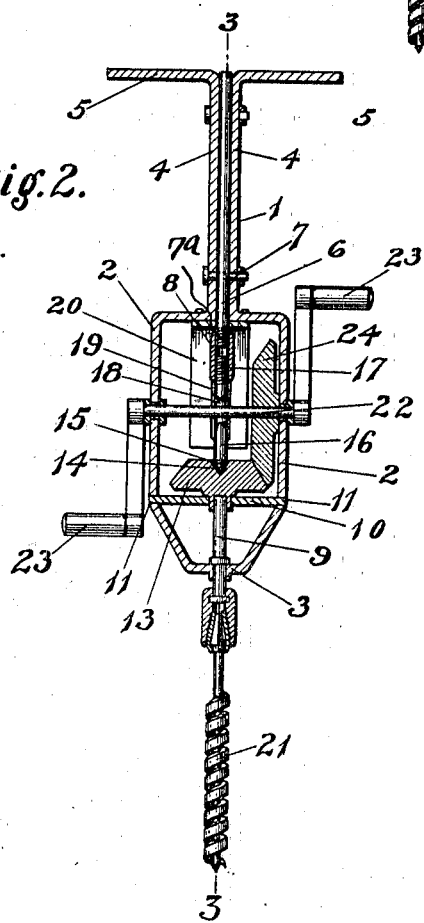
Figure 3:
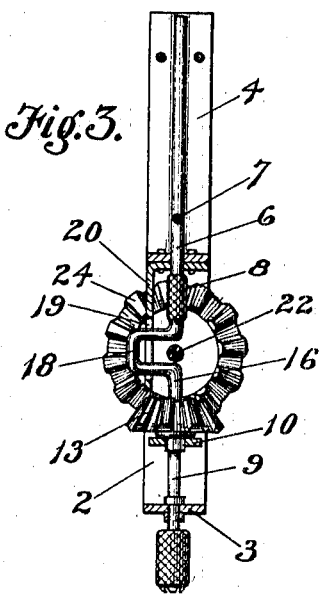

In the drawing forming a portion of this application and in which like letters of reference indicate similar parts in the several views:—Figure 1 is a perspective view of the auger. Fig. 2 is a vertical section therethrough. Fig. 3 is a section on line 3—3 of Fig. 1.

The auger comprises a supporting frame 1 which is preferably constructed from a single piece of metal bent upon itself to provide the parallel side portions 2, and the end portion 3 and the companion shank forming portions 4, the terminals of the said portions 4 being extended in opposite directions as at 5 so as to form a rest against which the breast of the operator may be brought to bear so that the cutting tool of the auger can be operatively applied to its work.

A rod 6 is secured by the bolt 7 between the portions 4 of the frame 1, and as illustrated this rod is provided with a threaded portion 7ᵃ which extends into the space of the frame 1 which is defined by the parallel side portions 2 and the end 3 of the frame 1. The portion 7 has adjustably connected therewith a coupling sleeve 8 which is knurled exteriorly whereby it can be manually adjusted.

A chuck-carrying spindle 9 is journaled in the center of the portion 3 of the frame 1 and in a bearing bar 10. The said bar 10 is secured as at 11 to the portions 2 as shown. The spindle 9 has secured thereto a beveled gear wheel 13 which is provided with a conical recess 14 which receives the conical end 15 of the adjustable thrust bearing 16. This thrust bearing is provided with an integral threaded portion 17 which also receives the sleeve or coupling member 8 whereby when the latter is adjusted the thrust bearing, and the portion 6 upon the frame 1 can be adjusted relatively to regulate the bearing efficiency of the portion 16 as is understood. With a view to preventing the retrograde rotation of the thrust bearing we provide the latter with an offset portion 18 which is slidable in the elongated slot 19 in the extension 20 upon the frame 1. The spindle 9 may be of any suitable well known construction and as illustrated it has a cutting tool 21 detachably connected thereto.

A driving shaft 22 is journaled in the portions 2 of the frame 1 and at each end the shaft is provided with a crank handle 23. Secured to the shaft 22 is a driving or beveled gear wheel 24 which meshes with the gear wheel 13 so that the cutting tool of the auger will be revolved when power is applied to said shaft 22.

The shank of the frame 1 which, as described, is formed by the portions 4 is reinforced materially by extending the rod 6 therebetween as shown. The said shank of the frame is disposed in axial alinement with the cutting tool so that the latter will revolve with a maximum efficiency and with an expenditure of a minimum amount of power. As the occasion may demand the bearing 16 and the rod 6 can be adjusted relatively so that the intermeshing gear wheels can be maintained in proper engagement.

We claim:

1. An auger comprising a frame having a shank portion, a breast engaging portion at one end of the shank, a chuck-carrying spindle revolubly mounted in the frame and provided with a gear wheel, a driving shaft supported by the frame, a gear wheel carried by the driving shaft and meshing with the first gear wheel, and a bearing engaging against the first gear wheel in axial alinement with the chuck and in axial alinement with the shank.

2. A tool of the character described comprising a frame, a chuck-carrying spindle revolubly mounted in the frame and provided with a gear wheel, a driving crank shaft carried by the frame, a gear wheel on the crank shaft meshing with the first gear wheel, and an adjustable thrust bearing carried by the frame and bearing against the first gear wheel in axial alinement with said chuck.

3. A tool of the character described comprising a frame having a shank portion provided with a breast rest at one end, a driving crank shaft journaled in the frame, a gear wheel on the shaft, a second gear wheel journaled in the frame, a chuck-carrying spindle carried by the second gear wheel, a rod secured to the shank of the frame, a thrust bearing disposed in axial alinement with the rod and engaging against the second gear wheel, a slotted member on the frame, means on the thrust bearing having sliding engagement in the slot, and a coupling sleeve adjustably connecting the rod with said thrust bearing.

4. A tool of the character described comprising a frame having a shank portion provided with a breast rest at one end, a driving shaft journaled in the frame, a gear wheel on the shaft, a second gear wheel journaled in the frame at right angles to the first-gear-wheel and engageable therewith, a chuck-carrying spindle attached to the second gear wheel, means for operating the first gear wheel, a rod secured to the shank of the frame, a thrust bearing adjustably secured to said rod and disposed in axial alinement therewith and engaging the second-gear-wheel, and means for preventing rotation of the said thrust bearing.

In testimony whereof we affix our signatures in presence of two witnesses.

A. P. WELLS.
J. C. WELLS.

Witnesses:
E. B. McELROY,
T. W. OWENS.